March 5, 1940.    R. F. BEAN    2,192,844
COUPLING
Original Filed Sept. 28, 1937
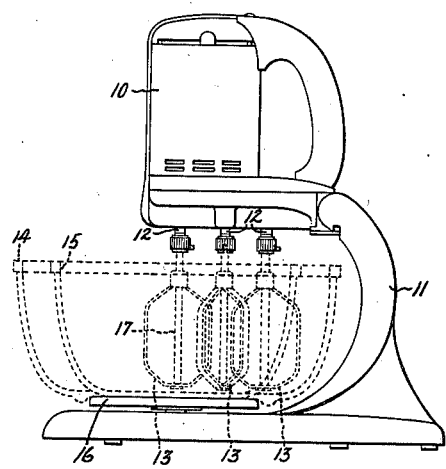
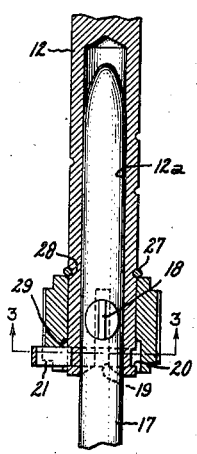
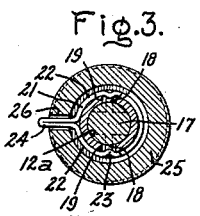
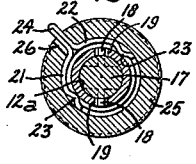
Inventor:
Robert F. Bean,
by Harry E. Dunham
His Attorney.

Patented Mar. 5, 1940

2,192,844

UNITED STATES PATENT OFFICE 2,192,844

COUPLING

Robert F. Bean, Bridgeport, Conn., assignor to General Electric Company, a corporation of New York Original application September 28, 1937, Serial No. 166,063. Divided and this application September 8, 1938, Serial No. 228,972

7 Claims. (Cl. 287—103)

This invention relates to couplings, more particularly to couplings for effecting a driving connection between a driving shaft and a driven shaft, and it has for its object the provision of an improved device of this character.

This invention is particularly applicable to power-operated household mixing devices, and it contemplates an improved coupling for effecting a driving connection between the heating or mixing tool shaft and the driving shaft of the mixing device.

In accordance with this invention, the driving shaft and the beating tool shaft, that is, the driven shaft, are fitted together in telescopic relation. One shaft carries a lug or projection that is received in a slot in the other, and this other shaft carries a locking member that is spring-snapped into the slot in a position to prevent withdrawal of the lug and hence of the beating tool shaft to which it is attached.

This application is a division of my copending application Serial No. 166,063, filed September 28, 1937.

For a more complete understanding of this invention, reference should be had to the accompanying drawing in which Fig. 1 is a side elevation of a food mixing device provided with couplings between the beating tools and the driving shafts of the device arranged in accordance with this invention; Fig. 2 is an enlarged fragmentary sectional view illustrating the coupling used to connect the beater elements to their driving spindles and arranged in accordance with this invention; Fig. 3 is a sectional view taken through the line 3—3 of Fig. 2 and looking in the direction of the arrows; and Fig. 4 is a view similar to Fig. 3 but illustrating certain of the elements in different operative positions.

Referring to the drawing, this invention has been shown in one form as applied to a coupling for connecting the beater elements of a household food mixing device to its driving shafts or spindles. More specifically, this invention has been shown in one form in connection with the food mixing device described and claimed in my above-mentioned copending application. As there described, this food mixing device comprises a power unit 10 mounted upon a suitable base 11. The power unit 10 is provided with three spaced driving shafts or spindles 12 for driving three beater elements 13. These elements are arranged to operate in large and small bowls 14 and 15 that are adapted to be separately supported on a turn table 16. When the large bowl 14 is used three beaters 13 are employed, while when the small bowl 15 is used only the two outer beater elements 13 are used, as described and claimed in my copending application referred to above.

Each beater element 13 comprises a shaft 17 which is arranged to be operated by one of the driving spindles 12. The coupling means arranged in accordance with this invention for effecting a driving connection between the spindle 12 and associated beater element shaft 17 is shown in detail in Figs. 2, 3, and 4. As shown in these figures, each driving shaft or spindle 12 has a hollow tubular section 12a at its lower end which is arranged to receive the upper end portion of the shaft 17 in telescopic relation. This upper end is provided with oppositely positioned driving lugs 18 that are received in oppositely positioned slots 19 provided for them in the lower end of the shaft 12.

The shaft 12 is provided adjacent its lower end with a circular recess 20 intersecting the slots 19 and which receives a spring member 21. This spring member has a pair of legs 22 forming in general a U, and these legs at their ends are provided with deformed sections 23 directed inwardly toward the shaft 12. These legs, as shown, are mounted in the recess 20.

The legs 22 are joined together by a hairpin-shaped nexus 24. As shown, the two arms of this nexus are pressed together or otherwise formed so as to be in close contact with each other.

The nexus 24 serves to rotate the spring legs 22 in the recess 20. For this purpose, a collar 25 is provided on the lower end of each driving shaft 12. The collar 25, as shown, has an aperture 26 which receives the nexus 24. By reason of this connection when the collar 25 is rotated on the shaft 12, it will rotate the nexus so as to rotate the spring arms 22 in their recess 20.

When the collar 25 is rotated to such a position that the deformed sections 23 are opposite the slots 19 they will spring or snap into slots, as shown in Fig. 3, and assuming that the driving shaft 17 has been inserted in the tubular section 12a of the shaft 12 with the driving lugs 18 positioned well up in the slots 19, the deformed sections 23 will lie under the driving lugs 18 so as to prevent withdrawal of the shaft 17 from the driving spindle. In other words, when the collar 25 is in its position of Fig. 3, the shaft 17 will be locked to the spindle 12 so that the beater 13 will be supported vertically in the spindle by the engagement of the lugs 18 with the spring legs 22, and also through the lugs 18 and the slots 19 will have a driving connection with the spindle. When the collar 25 is rotated in either direction from its position of Fig. 3 to some position such as that shown in Fig. 4, it will rotate the spring member 21 so as to remove the deformed sections 23 from the slots 19 thereby releasing the shaft 17 and hence the beater shaft 17. The beater 13 may then be withdrawn axially from the driving shaft 12.

The collar 25 is prevented from moving vertically with reference to the driving shaft 12 by means of a wire ring member 27 that is mounted in a recess 28 in the shaft 12 above the upper end of the collar, as shown in Fig. 2, and by means of a seat 29 on the collar at its lower end, which seat is adapted to engage the upper edge of the spring. The spring, therefore, functions not only to lock the shaft 17, but it also functions to prevent withdrawal of its driving collar from the shaft 12.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. In combination, a shaft having a lug, a support for said shaft receiving it in telescopic relation and having a slot receiving said lug and also having a circumferential recess intersecting said slot, a spring mounted in said recess for rotary movement therein and having a deformed section that snaps into said slot to prevent withdrawal of said lug and the shaft when said spring is rotated to move said section into a position opposite said slot, the resiliency of said spring providing for withdrawal of said deformed section from said slot when said spring is rotated to carry the deformed section to a circumferential position removed from said slot.

2. In a mixing device and the like, a tubular driving spindle, a tool insertable in said spindle having a projecting lug received in a slot provided for it in the end of said spindle, said spindle having a circumferential recess adjacent said end intersecting said slot, a spring having an arm rotatable in said recess about the axis of said spindle, said arm having an inwardly deformed portion arranged to be snapped into said slot by the spring arm when the spring arm is rotated to a predetermined locking position so as to prevent withdrawal of said lug and the tool, and moving from said slot when said spring arm is rotated from said locking position, and means for rotating said spring arm in said recess to move said deformed portion into said locking position to withdraw it from said position.

3. In a mixing device and the like, a tubular driving spindle, a tool insertable in said spindle having projecting lugs received in slots in the end of said spindle to effect a driving connection between the tool and spindle, a spring having deformed sections biased to move into said slots by the resiliency of said spring and movable into them when the spring is moved to a predetermined locking position, and a collar surrounding and rotatable with said spindle connected to said spring to move it to and from said position.

4. In a mixing device and the like, a tubular driving spindle, a tool insertable in said spindle having projecting lugs received in slots in the end of said spindle, said spindle having a circular recess adjacent said end, a spring having arms movable in said recess, each arm having an inwardly deformed portion arranged to be snapped into one of said slots by the spring arm when the spring is moved to a predetermined locking position so as to prevent withdrawal of said lugs and their tool, a collar surrounding the end portion of said shaft, and said spring having a part received in a slot provided for it in said collar to lock the spring to the collar, whereby the spring is movable to and from said locking position by rotation of said collar.

5. In a mixing device and the like, a tubular driving spindle, a tool insertable in said spindle having projecting lugs received in slots in the end of said spindle, said spindle having a circular recess adjacent said end, a spring having arms movable in said recess, each arm having an inwardly deformed portion arranged to be snapped into one of said slots by the spring arm when the spring is moved to a predetermined locking position so as to prevent withdrawal of said lugs and their tool, a collar surrounding the end portion of said shaft and said spring having a part received in a slot provided for it in said collar to lock the spring to the collar, whereby the spring is movable to and from said locking position by rotation of said collar, and said collar having an abutment engageable with said spring to prevent withdrawal of the collar from said spindle.

6. In combination, a tubular driving shaft, a driven shaft insertable in said driving shaft having projecting lugs received in slots in the end of said driving shaft to effect a driving connection between the driving and driven shafts, a spring having legs defining a U received in a recess provided for it in said driving shaft, the legs having deformed sections that are arranged to be received in said slots to lock the driving lugs in the slots and to thereby prevent the withdrawal of the driven shaft, a collar surrounding the driven shaft rotatable with it and having a driving connection with the spring to move the deformed sections into said slots and to remove them from the slots, an abutment on the driving shaft on one side of the collar and the collar having a seat adapted to engage the spring at the other side of the collar, the seat and the abutment substantially preventing longitudinal movement of the collar on the driving spindle.

7. In a mixing device and the like, a tubular driving spindle, a tool insertable in said spindle having a projecting lug received in a slot provided for it in the end of said spindle, said spindle having a circular recess adjacent said end intersecting said slot, a spring rotatable in said recess having an arm provided with a deformed section arranged to be snapped into said slot by the spring arm when the spring is rotated to a predetermined locking position so as to prevent withdrawal of said lug and the tool and to be withdrawn from said recess when said spring is rotated from said locking position, a collar mounted on said spindle for rotary motion with relation to the spindle surrounding said spring and having an interlocking connection with it so that said spring is rotated to and from said locking position by rotation of said collar with relation to said spindle.

ROBERT F. BEAN.